US006935530B2

(12) United States Patent
Semeniuk et al.

(10) Patent No.: US 6,935,530 B2

(45) Date of Patent: Aug. 30, 2005

(54) DUAL STATION COIN-OPERATED VENDING MACHINE

(75) Inventors: Thomas N. Semeniuk, Winnipeg (CA); Kil Jae Chang, Anyang (KR)

(73) Assignee: Vendmax International Inc., Winnipeg (CA)

(*) Notice: Subject to any disclaimer, the term of this patent is extended or adjusted under 35 U.S.C. 154(b) by 200 days.

(21) Appl. No.: 10/652,761

(22) Filed: Aug. 29, 2003

(65) Prior Publication Data

US 2005/0045651 A1 Mar. 3, 2005

(51) Int. Cl.[7] .................. B65G 59/00

(52) U.S. Cl. .................. 221/124; 221/265

(58) Field of Search .................. 221/155, 265, 221/266, 124, 123, 133, 119, 120, 132; 222/367

(56) References Cited

U.S. PATENT DOCUMENTS

| | | | | | |
|---|---|---|---|---|---|
| D103,055 | S | | 2/1937 | Main | |
| 2,537,317 | A | | 1/1951 | Probasco | 312/89 |
| 2,772,811 | A | | 12/1956 | Schaef | 221/155 |
| 3,010,557 | A | | 11/1961 | Weitzman | 194/63 |
| 4,768,683 | A | | 9/1988 | Gold et al. | 222/328 |
| 4,896,798 | A | | 1/1990 | Milton | 222/307 |
| 5,018,644 | A | * | 5/1991 | Hackmann et al. | 221/65 |
| D319,558 | S | | 9/1991 | De Regt | D7/601 |
| 5,082,101 | A | | 1/1992 | Baker et al. | 194/350 |
| D331,603 | S | | 12/1992 | Peterson | D20/7 |
| D344,762 | S | | 3/1994 | Peterson | D20/7 |
| D453,532 | S | | 2/2002 | Semeniuk | D20/7 |

* cited by examiner

*Primary Examiner*—Kenneth Noland

(74) *Attorney, Agent, or Firm*—John R. Flanagan

(57) ABSTRACT

A dual station coin-operated vending machine includes a housing, a globe on the housing with a central vertical partition dividing a reservoir of the globe into separate compartments, a pair of coin-operated dispensing mechanisms each disposed in the housing below one globe compartment, a pair of discharge chutes disposed in the housing below and each associated with one dispensing mechanism, and a dual hopper disposed in the housing below the globe and above the dispensing mechanisms. The dual hopper has a downwardly concave shaped top surface leading to spaced apart openings therein, each overlying and aligned with a dispensing wheel of one dispensing mechanism, and a raised ridge formed on the top surface and aligned below the globe partition so as to isolate the dual hopper openings from one another to receive items only from separate globe compartments.

20 Claims, 12 Drawing Sheets

DUAL STATION COIN-OPERATED VENDING MACHINE

BACKGROUND OF THE INVENTION

1. Field of the Invention

The present invention generally relates to coin-operated vending machines and, more particularly, is concerned with a dual station coin-operated vending machine.

2. Description of the Prior Art

One general type of coin-operated vending machine, which has been widely used, has a large transparent globe within which items, such as candy, gum or toys, are stored and displayed, a pedestal-like base supporting the globe, and a dispensing mechanism mounted in the base below the globe. The dispensing mechanism has an external coin slot and a handle or knob adapted to be turned by a user, after depositing a coin in slot, to cause the dispensing mechanism to discharge a predetermined quantity of the items from the globe down a discharge chute in the base to an end of the discharge chute externally accessible by lifting a pivotal door mounted on the exterior of the base. The deposited coin falls into a collection box located in the base behind the discharge chute.

Over the years evolution in the construction of this general type of coin-operated vending machine has occurred. One recent version of this vending machine type has been successfully commercialized by Vendmax International Inc. of Winnipeg, Canada, and is illustrated in U.S. Pat. No. D453,532 to Semeniuk, one of the co-inventors herein, and also is illustrated in detail in FIGS. 1–9 and 21 herein.

As shown in FIGS. 1–9 and 21, the prior art Vendmax vending machine, generally designated 10, includes a base 12, a globe 14 seated on the base 12, a coin-operated dispensing mechanism 16 in the base 12 below the globe 14, a discharge chute 18 in the base 12 below the dispensing mechanism 16, and a coin collection box 20 in the base 12 behind the discharge chute 18. The base 12 includes a housing 22 and a receptacle 24. The housing 22 has a central vertical axis A and an overall polygonal configuration formed by multiple angularly-displaced side walls 26 which are greater than four in number, for example eight side walls 26, and together define an interior chamber 28. The housing 22 is closed at its lower end by a bottom wall 30 and has an opening 32 at its upper end defined by an annular top rim 22A.

The receptacle 24, as best shown in FIG. 5, has a central vertical axis B extending coaxially with the central vertical axis A of the housing 22. The receptacle 24 includes a continuous top annular flange 34 encircling the central axis B, an outer ledge 36 attached to and projecting outwardly from one side of the top flange 34, a continuous annular inner ledge 38 attached to and projecting inwardly from the top flange 34, a cylindrical sidewall 40 attached to and projecting downwardly from the inner ledge 38, and a bottom panel 42 spaced below the inner ledge 38 and closing the bottom end of the sidewall 40. The top flange 34 of the receptacle 24 in cross-section is inverted U-shaped permitting the top flange 34 to be disposed upon and over the upper rim 22A on the upper end of the housing 22. The cylindrical sidewall 40 and bottom panel 42 of the receptacle 24 together have a discharge opening 44 defined in a sector thereof that extends radially outwardly from the central axis B so as to offset the discharge opening 44 to one side of the central axis B.

The globe 14 of the prior art Vendmax vending machine 10 preferably is made of a transparent material, such as a suitable plastic, and has generally the same polygonal configuration as the housing 22 and opposite annular lower and upper rims 14A, 14B defining lower and upper openings 46, 48 of the globe 14. The globe 14 at its lower rim 14A, resting upon the top flange 34 of the receptacle 24, is supported by the top rim 22A of the housing 22. The globe 14 defines an interior reservoir 50 for containing product items P above the receptacle 24 for feeding by gravity through the discharge opening 44 in the receptacle 24 upon actuation of the machine 10 by the coin-operated dispensing mechanism 16.

The Vendmax vending machine 10 also includes a top cover 52, an annular cover seat 54, and a pair of tie rods 56. The cover seat 54, being circular in configuration, seats on the upper rim 14B of the globe 14. The top cover 52 rests over the cover seat 54 and thus on the upper rim 14B of the globe 14. The tie rods 56, being elongated bolts, extend downward through ears 54A on the cover seat 54 and through the interior reservoir 50 of the globe 14 to where the lower ends of the tie rods 56 are threaded into holes (not shown) tapped in the inner ledge 38 of the receptacle 24 so as to secure the cover seat 54 over the upper opening 48 of the globe 14 and to the receptacle 24.

The coin-operated dispensing mechanism 16 and discharge chute 18 of the Vendmax vending machine 10 are disposed within the interior chamber 28 of the housing 22. The dispensing mechanism 16 is mounted to and extends inwardly across the interior chamber 28 from the interior of one side wall 26A of the multiple side walls 26 of the housing 22. The one side wall 26A has an angled configuration different than the flat outwardly sloping configurations of the remaining side walls 26. The outer side ledge 36 of receptacle 24 overlies and covers the upper end of the one side wall 26A of the housing 22.

The dispensing mechanism 16 includes a plate 58 attached to the one side wall 26A of the housing 22 having a coin receiving slot 58A in the top of the plate 58, a shaft 60 rotatably mounted to the plate 58, a coin-actuating turning knob 62 mounted to an outer end 60A of the shaft 60 at the exterior of the plate 58 and of the one side wall 22A, and a drive gear 64 attached to an inner end 60B of the shaft 60 for rotation therewith. The drive gear 64 has a series of radially projecting teeth 64A attached thereon.

The dispensing mechanism 16 also includes an annular guide ring 66 and a dispensing wheel 68. The guide ring 66 is of circular shape and seated about and upon the inner ledge 38 of the receptacle 24 and extends downwardly therefrom along the sidewall 40 of the receptacle 24. The dispensing wheel 68 has an upstanding sidewall 70 with an upper annular edge 70A which slidably fits into an annular groove 66A defined in the underside of a bottom edge 66B of the annular guide ring 66. The upstanding sidewall 70 also has a lower annular flange 70B attached to and protruding outwardly from the sidewall 70. The dispensing wheel 68 also has a series of circumferentially arranged teeth 72 are attached to and extend downwardly from an underside of the flange 70B such that the dispensing wheel 68 at the series of teeth 72 thereof intersects with, rests upon, and successively intermeshes with, the series of teeth 64A on the drive gear 64 so that the dispensing wheel 68 is rotatably driven relative to the guide ring 66 upon turning of the knob 62 and rotation of the shaft 60 and drive gear 64 therewith. The guide ring 66 is held in a stationary position relative to the rotation of the dispensing wheel 68 by the fact that the tie rods 56 extend through a pair of apertures 66C in the guide ring 66 before the tie rods 56 reach and attach to the inner ledge 38 of the receptacle 24.

The dispensing wheel 68 further has a central bottom panel 74 attached to the sidewall 70 thereof and a central tubular pedestal 76 fixed on the bottom panel 74 and extending upwardly therefrom. A central lock device 78 for securing the top cover 52 on the globe 14 and also the hopper 24 and globe 14 to the housing 22 is provided in the machine 10. The central lock device 78 includes a key actuated component 80 mounted centrally in the top cover 52 and an elongated rigid rod 82 which extends downward through the globe 14, the housing 22 and the central tubular pedestal 76 on the dispensing wheel 68. The component 80 permits removal of the top cover 52 by authorized personnel in order to refill the globe 14. The elongated rod 82 has an externally-threaded lower end 82A which threads into an internally-threaded lug 30A formed on the interior of the bottom wall 30 of the housing 22. A sweep arm 84 is attached to the upper end of the central pedestal 76 and projects radially outwardly therefrom so as to revolve about the rod 82 with the rotating pedestal 76 as the dispensing wheel is rotated by the turning of the knob 62. The sweep arm 84 revolves near the lower opening 46 of the globe 16 so as to stir the items contained therein so as to ensure that the items will drop by gravity onto the central bottom panel 74 of the dispensing wheel 68. The central bottom panel 74 of the dispensing wheel 68 also has three openings 86 circumferentially arranged relative to one another and defined therethrough such that successive ones of the openings 86 per each turn of the knob 62 are brought into alignment with the discharge opening 44 in the receptacle 24 and the discharge chute 18 aligned below the discharge opening 44 whereby with each turn of the knob 62 in response to depositing of a coin C in the slot 58A an item or items of product P will drop through the dispensing wheel 68 down the discharge chute 18 to behind an access door 88 which is pivotally attached to the one side wall 26A of the housing 22 below the knob 62. The user can pivotally open the access door 88 to retrieve the dispensed item(s). The discharge chute 18 is attached to the housing 12 at an interior location thereon surrounding the access door 88 and extending upwardly therefrom to below the dispensing wheel 68.

The coin collection box 20 is disposed in the interior chamber 28 of the housing 22 immediately above the bottom wall 30 thereof. Also, an elongated coin chute 90 is disposed in the interior chamber 28 of the housing 22 which extends from the plate 58 to the collection box 20 for routing thereto any coins C that were deposited in the coin slot 58A in the plate 58. The collection box 20 has an exterior end 20A exposed at the exterior of the housing 22 through an opening 22B formed in a second side wall 26B (an partially in the two side walls 226 adjacent thereto) of the multiple side walls 26 spaced oppositely to the one side wall 26A of the housing 22. A lock device 92 is mounted in the interior chamber 28 of the housing 22 below the collection box 20 and has a key actuated component 94 mounted in the exterior end 20A of the collection box 20 which facilitates removal of the box 20 from the housing 22 by authorized personnel to retrieve the coins C therefrom.

While this prior art Vendmax vending machine has functioned satisfactorily in use in accordance with the specific purposes for which it was designed, a need for further innovations thereto has been felt by the original inventor to provide a more versatile machine without eliminating any of the desirable features of the prior art Vendmax vending machine.

SUMMARY OF THE INVENTION

The present invention provides a dual station coin-operated vending machine which is designed to satisfy the aforementioned need. The dual station vending machine of the present invention has a combination of features which includes a housing, a globe on the housing with a central vertical partition dividing a reservoir of the globe into a pair of compartments, a pair of coin-operated dispensing mechanisms each disposed in the housing below one of the compartments of the globe, a pair of discharge chutes disposed in the housing below and each associated with one of the dispensing mechanisms, and a dual hopper disposed in the housing below the globe and above the dispensing mechanisms and having a concave shaped top surface leading to spaced apart openings therein each overlying and aligned with one of respective dispensing wheels of the dispensing mechanisms and a raised ridge formed on the top surface extending across the dual hopper and aligned below the central partition of the globe so as to isolate the openings of the dual hopper and thus the dispensing wheels from one another to receive items only from a predetermined one of the globe compartments.

The dual station vending machine of the present invention with the foregoing features has substantially the same overall size and footprint as the Vendmax vending machine so as to take up the same amount of space while permitting coin-operated dispensing of different items which are separately stored in the globe of the dual station machine.

These and other features and advantages of the present invention will become apparent to those skilled in the art is upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
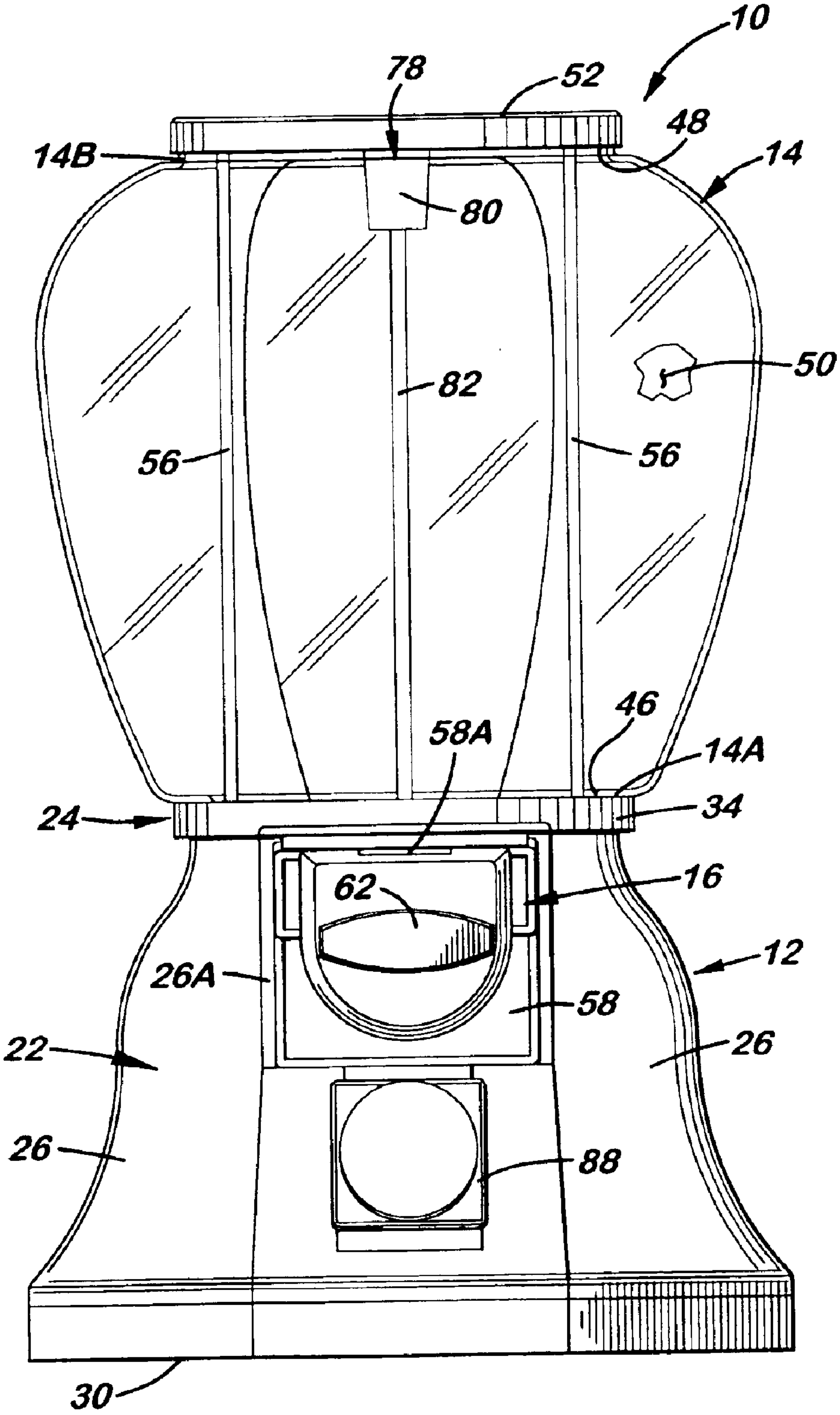
FIG. 1 (PRIOR ART)
FIG. 1 is a front elevational view of the Vendmax single station coin-operated vending machine of the prior art.
Figure 2:
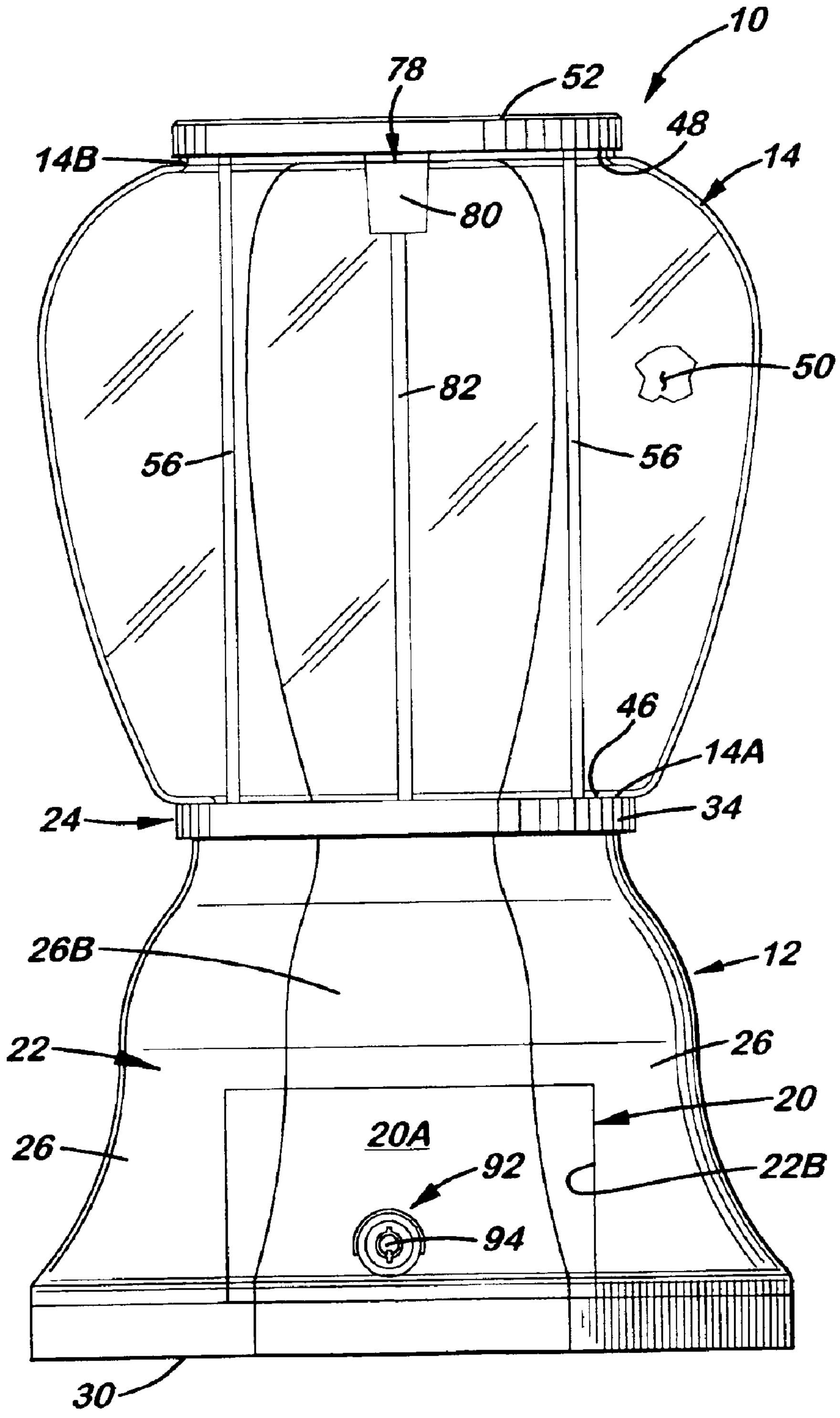
FIG. 2 (PRIOR ART)
FIG. 2 is a rear elevational view of the Vendmax vending machine of FIG. 1.
Figure 3:
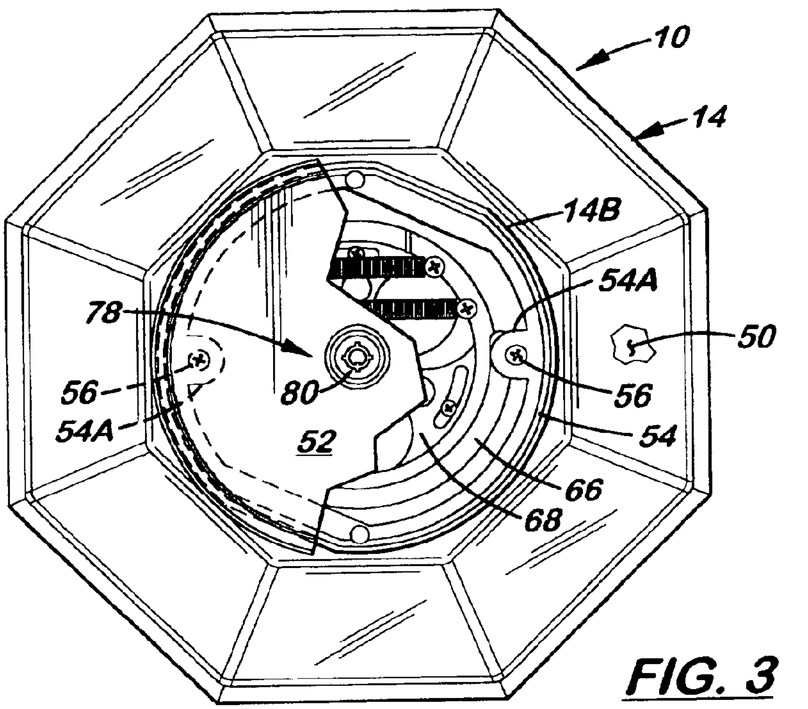
FIG. 3 (PRIOR ART)
FIG. 3 is a top plan view of the Vendmax vending machine of FIG. 1 with a portion of a top cover on a transparent globe of the machine broken away so as to expose a cover seat and pair of tie rods associated with the globe.
Figure 4:
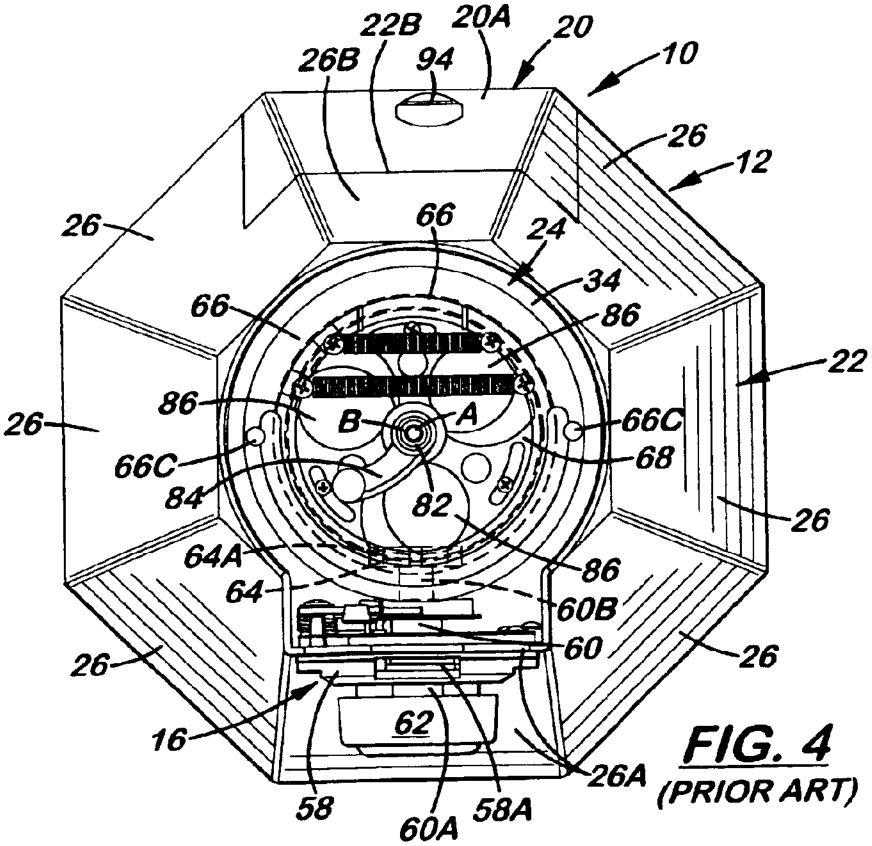
FIG. 4 (PRIOR ART)
FIG. 4 is a top plan view of the Vendmax vending machine of FIG. 1 with the transparent globe, top cover, cover seat and tie rods removed so as to expose a plate, coin receiving slot in the plate, a shaft, a turn knob on an outer end of the shaft, a drive gear on an inner end of the shaft, a guide ring and a dispensing wheel of a dispensing mechanism of the Vendmax vending machine.
Figure 5:
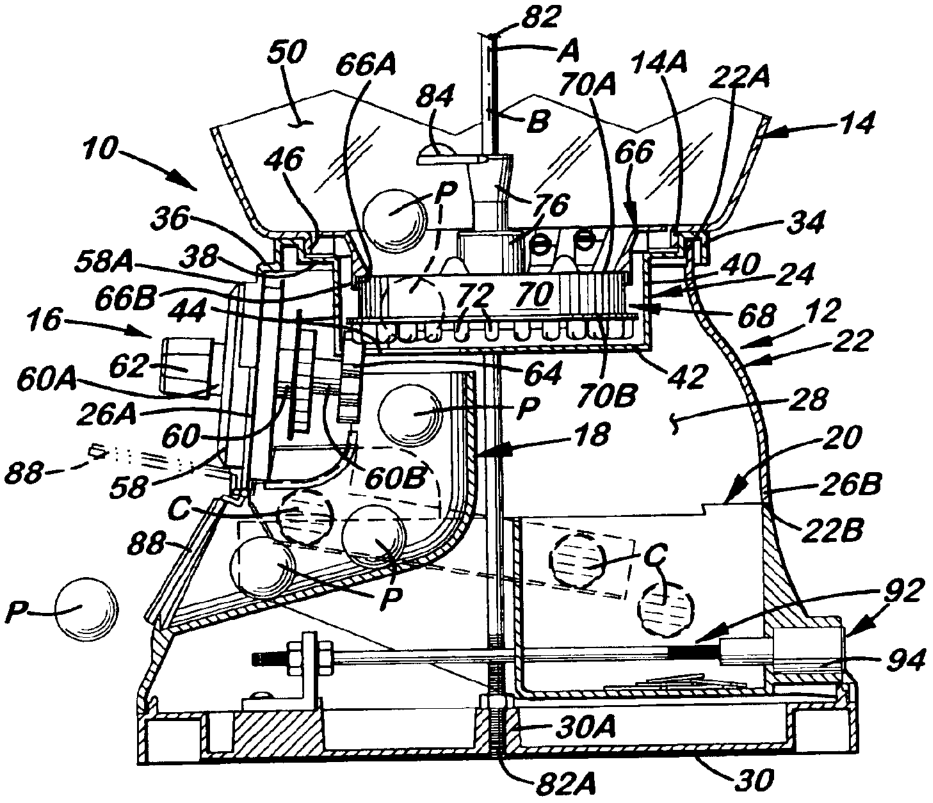
FIG. 5 (PRIOR ART)
FIG. 5 is a vertical sectional view through a base housing of the Vendmax vending machine and through a lower end portion of the globe so as to expose the aforementioned components of the dispensing mechanism and a discharge chute, collection box, central tie rod and base receptacle of the Vendmax vending machine.
Figure 6:
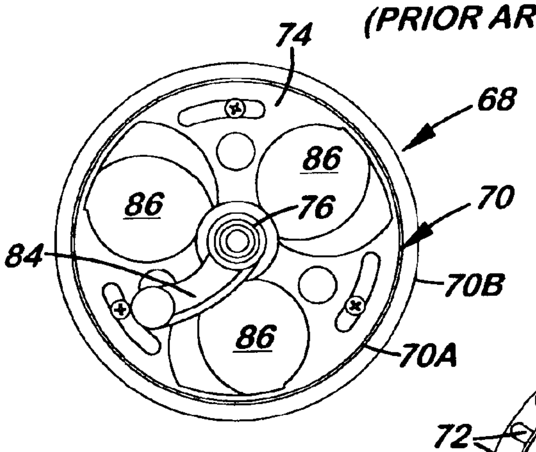
FIG. 6 (PRIOR ART)
FIG. 6 is a top plan view of the dispensing wheel of the dispensing mechanism removed from the Vendmax vending machine.
Figure 7:
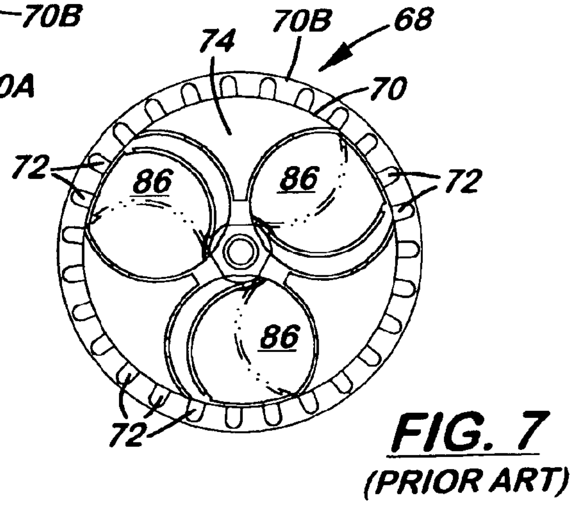
FIG. 7 (PRIOR ART)
FIG. 7 is a bottom plan view of the dispensing wheel of FIG. 6.
Figure 8:
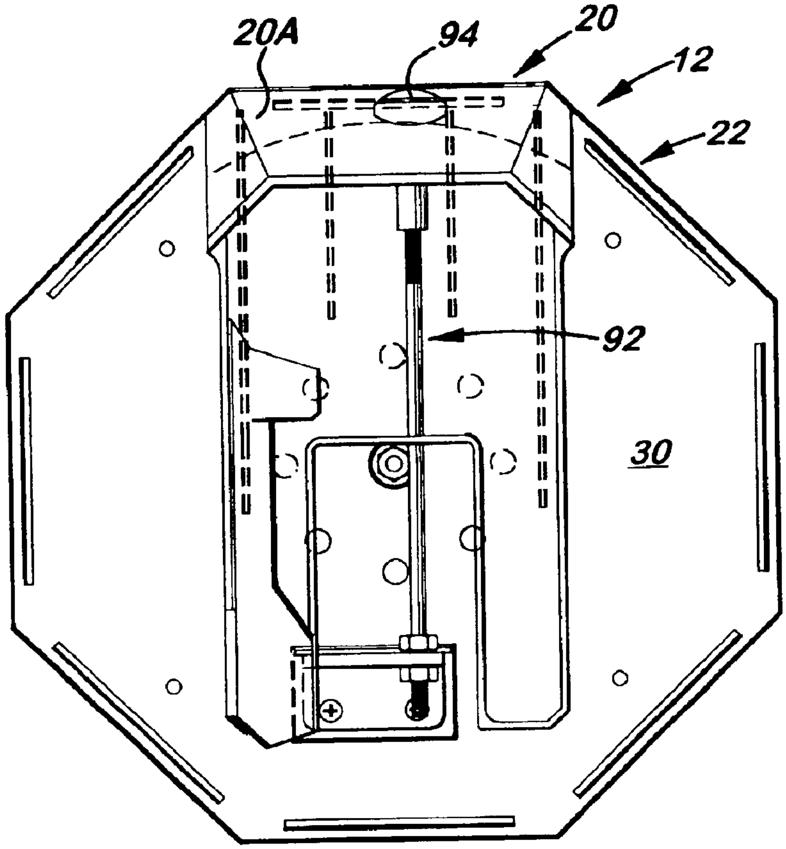
FIG. 8 (PRIOR ART)
FIG. 8 is a plan view of the housing of the Vendmax vending machine with portions above a bottom wall of the housing omitted to expose the coin collection box and an lock device located in the interior chamber of the housing immediately above the bottom wall thereof.
Figure 9:
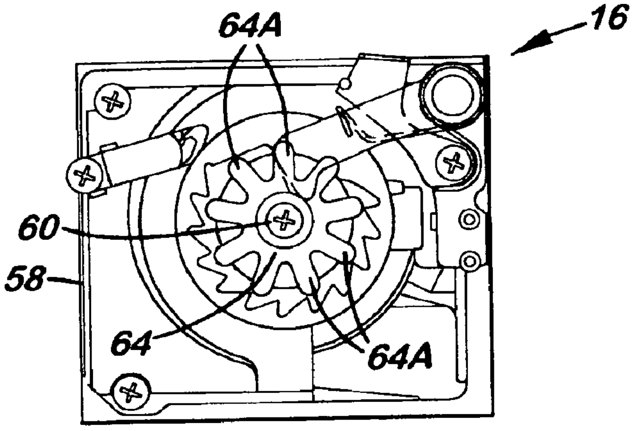
FIG. 9 (PRIOR ART)
FIG. 9 is a rear elevational view of the plate, shaft and gear of the dispensing mechanism removed from the Vendmax vending machine.

Referring to the drawings and particularly to FIGS. 10–20 and 22, there is illustrated a dual station coin-operated vending machine, generally designated 100, of the present invention. The dual station vending machine 100 basically includes a common base 102, a globe 104 seated on the base 102, a pair of coin-operated dispensing mechanisms 106 in the base 102 below the globe 104, a pair of discharge chutes 108 in the base 102 below the dispensing mechanisms 106, and a common coin collection box 110 in the base 102 angularly displaced from the discharge chutes 108.

Referring to FIGS. 10–14, the common base 102 includes a housing 112, a receptacle 114 and a dual hopper 116 all of which are common to the pairs of dispensing mechanism 106 and discharge chutes 108. The housing 112 has a central vertical axis X and an overall polygonal configuration formed by multiple angularly-displaced side walls 118 which are greater than four in number, for example eight side walls 118, and together define an interior chamber 120. The housing 112 is closed at its lower end by a bottom wall 122 and has an opening 124 at its upper end defined by an annular top rim 112A.

The receptacle 114 has a central vertical axis Y and is disposed in the receptacle 114 such that its central vertical axis Y extends coaxially with the central vertical axis X of the housing 112. The receptacle 114 includes a continuous top annular flange 126 encircling the central axis Y, a pair of outer ledges 128 attached to and projecting outwardly from side locations on the top flange 126 being angularly displaced from one another about the central axis Y, a continuous annular inner ledge 130 attached to and projecting inwardly from the top flange 126, a cylindrical sidewall 132 attached to and projecting downwardly from the inner ledge 130, and a bottom panel 134 spaced below the inner ledge 130 and closing the bottom end of the sidewall 132. The top flange 126 in cross-section is inverted U-shaped permitting it to be disposed upon and over the top rim 112A of the housing 112. The cylindrical sidewall 132 and bottom panel 134 together have a pair of discharge openings 136 defined in sectors thereof that extend radially outwardly from and are angularly displaced from one another about the central axis Y so as to offset the discharge openings 136 from the central axis Y. The receptacle 114 also includes a pair of seat rails 138 formed upon a top side of the bottom panel 134 so as to define shallow cavities 140 being angularly displaced from one another about the central axis Y which communicate with the discharge openings 136 in the sidewall 132 and bottom panel 134 and the discharge chutes 108 located below the discharge openings 136.

Referring to FIGS. 10, 13, 14 and 20, the dual hopper 116 is disposed in the receptacle 114 in the housing 112 below the globe 104 and above the dispensing mechanisms 106. The dual hopper 116 rests at an outer edge 116A upon the inner edge 130 of the receptacle 114 and has a top surface 142 of downwardly concave shape that leads downwardly and inwardly to a pair of spaced apart openings 144 defined in the dual hopper 116. The dual hopper 116 further has a raised ridge 146 formed on the top surface 142 so as to extend diametrically across the dual hopper 116 and isolate the openings 144 from one another at opposite sides of the raised ridge 146.

Figure 10:
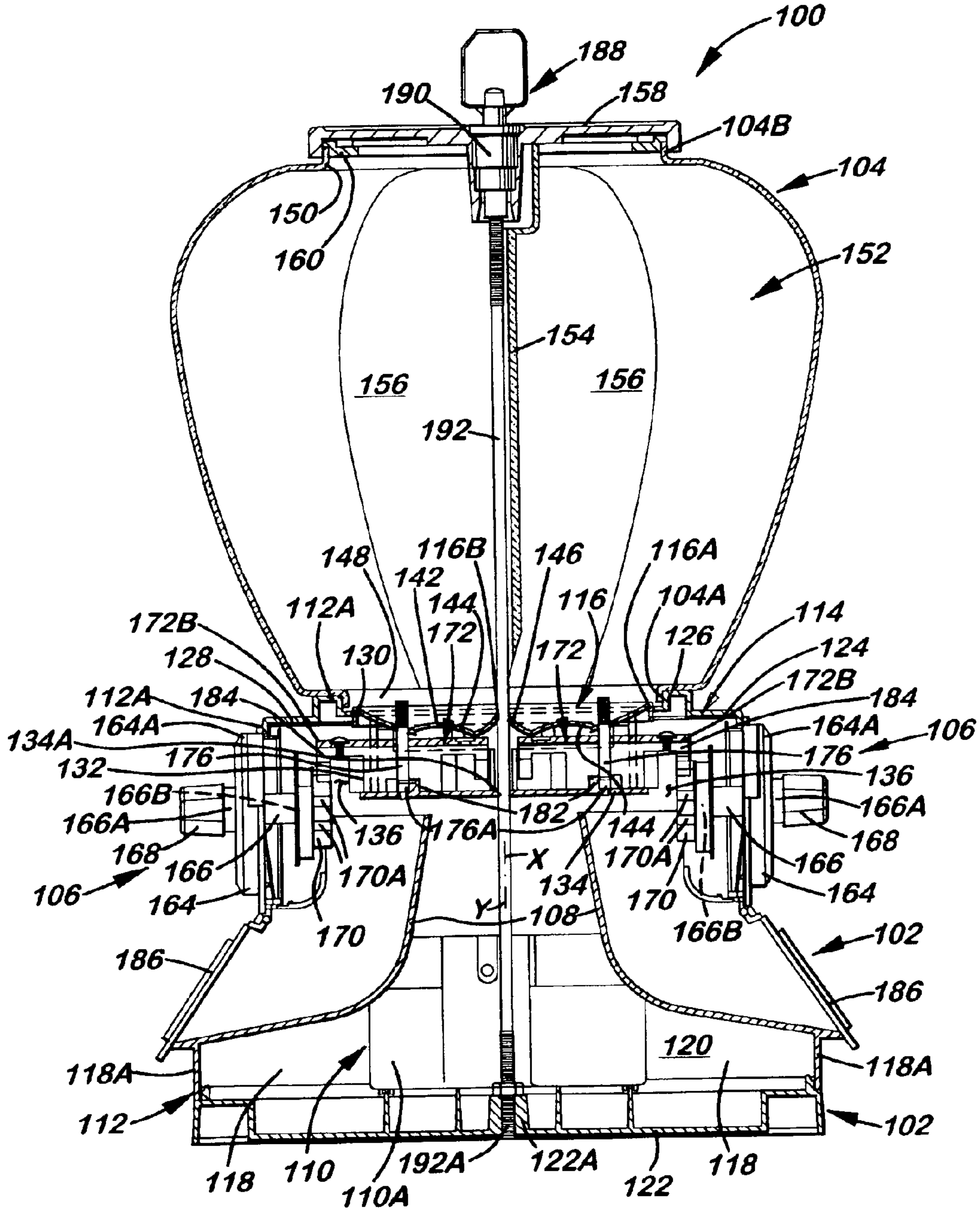
FIG. 10 is a vertical sectional view of a dual station coin-operated vending machine of the present invention showing the machine having a globe with a central vertical partition dividing its reservoir into a pair of compartments, a pair of coin-operated dispensing mechanisms each disposed below one of the compartments of the globe, a pair of discharge chutes each associated with one of the dispensing mechanisms, and a dual hopper disposed below the globe and having a concave shaped top surface leading to spaced apart openings therein which overlie and are aligned with respective dispensing wheels of the dispensing mechanisms and a raised ridge on the top surface extending across the dual hopper and aligned below the central partition of the globe so as to isolate the openings of the dual hopper and thus the dispensing wheels from one another to receive items only from a predetermined one of the globe compartments.
Figure 11:
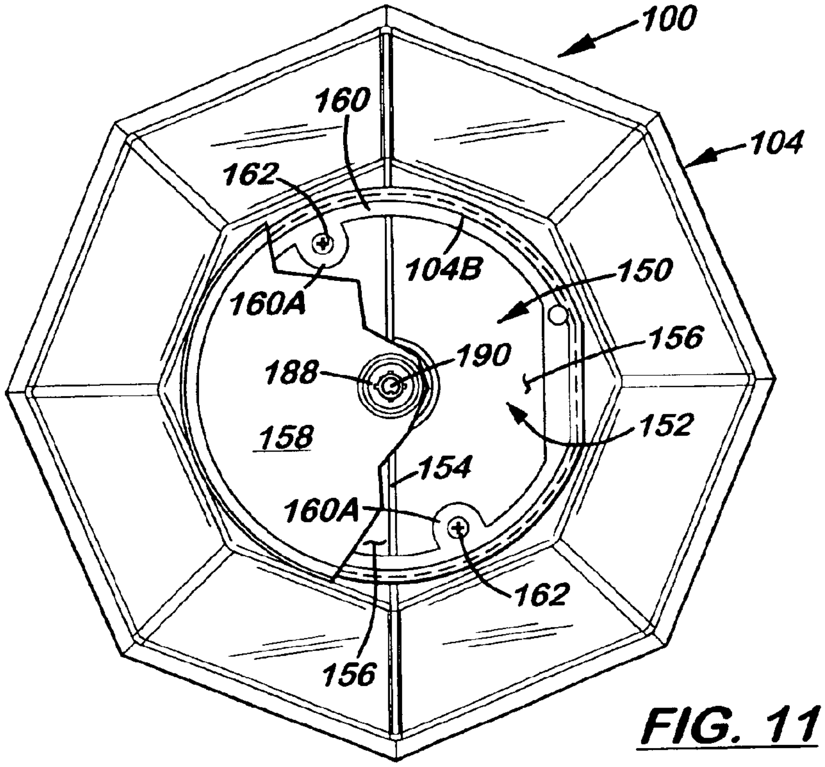
FIG. 11 is a top plan of the dual station vending machine of FIG. 10 with a portion of a top cover on the globe broken away so as to expose a cover seat and a pair of tie rods associated with the globe.
Figure 12:
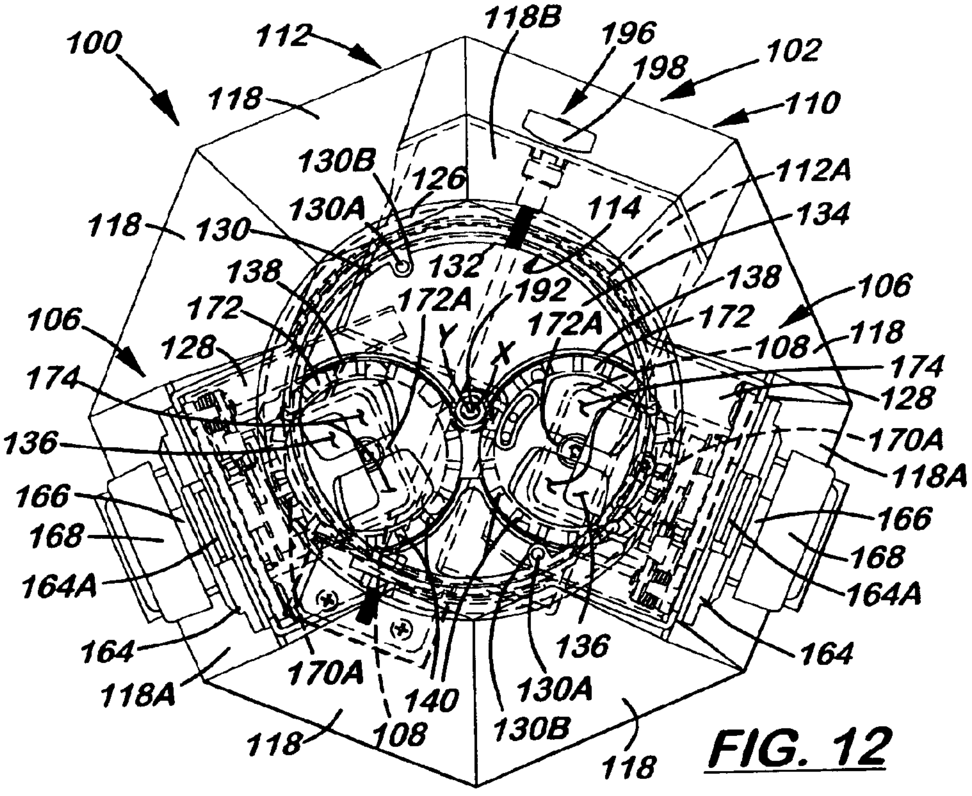
FIG. 12 is a top plan view of the dual station vending machine of FIG. 10 with the globe and dual hopper removed so as to expose the dispensing mechanisms.
Figure 13:
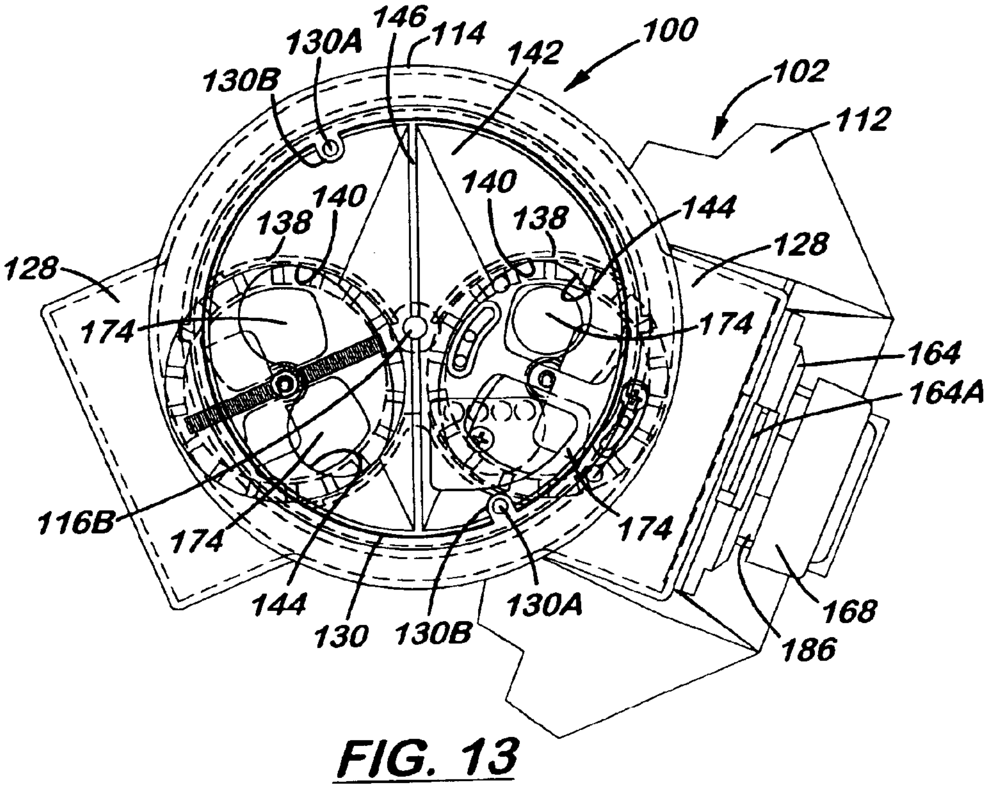
FIG. 13 is a top plan view similar to that of FIG. 12 now showing one of the dispensing mechanisms having a turning knob and dispensing wheel thereof in respective initial positions prior to a user turning the knob once a coin has been deposited in the coin-receiving hole of a plate of the dispensing mechanism and an item has descended from the globe to a resting position on the dispensing wheel.
Figure 14:
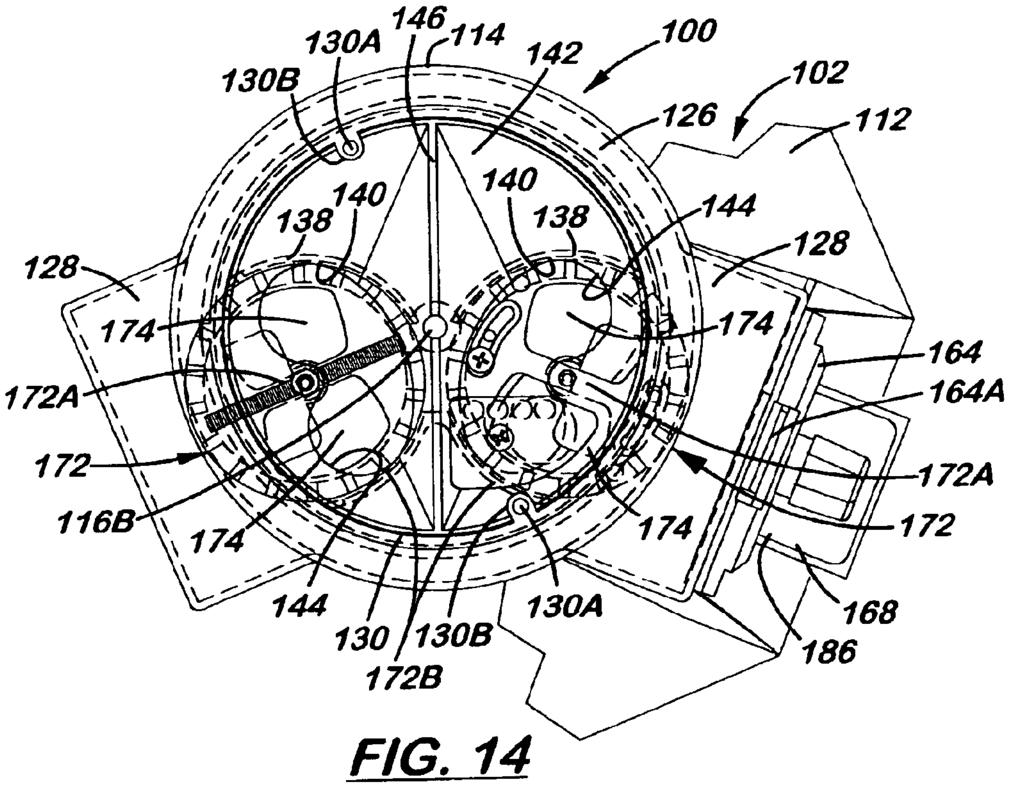
FIG. 14 is a top plan view similar to that of FIG. 13 now showing the turning knob and dispensing wheel of the one dispensing mechanism after being moving to respective displaced or final positions by the user turning the knob to cause rotation of the dispensing wheel which moves the item over and aligns the item with one of a pair of openings in a common receptacle upon which rests the respective dispensing wheels of the dispensing mechanisms.
Figure 15:
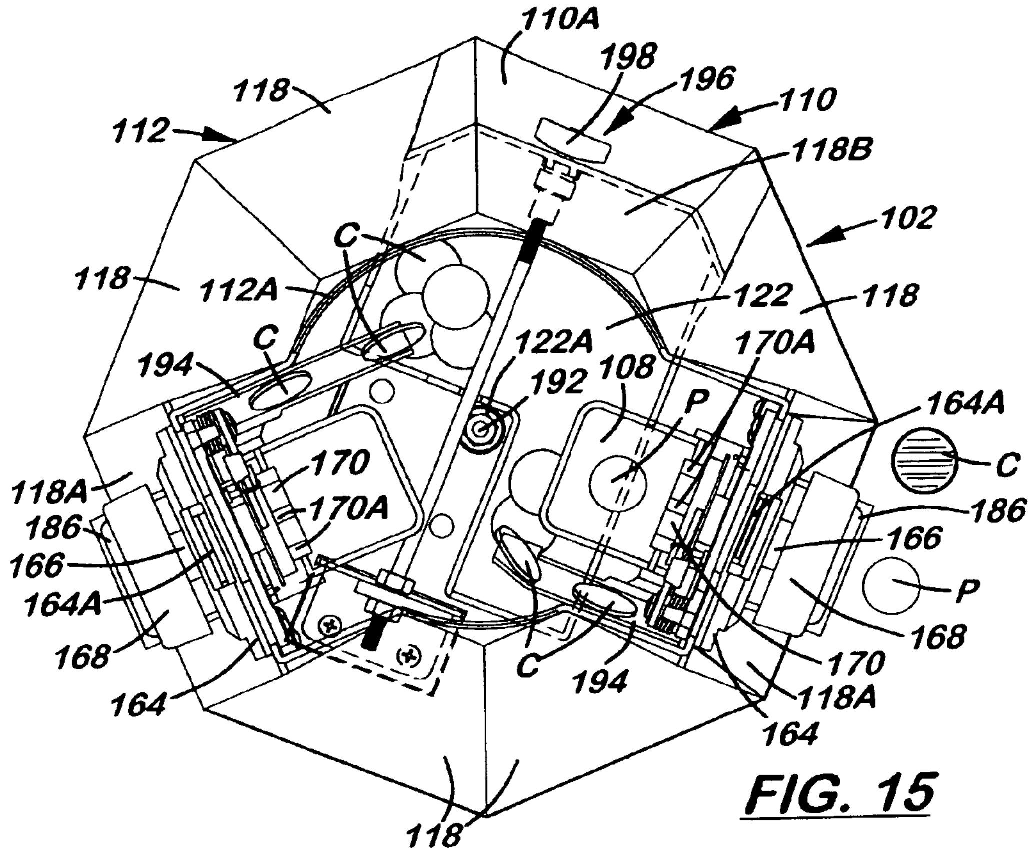
FIG. 15 is a top plan view of the housing of the vending machine of FIG. 10 with the globe, receptacle and dual hopper and the dispensing wheels of the dispensing mechanisms removed in order to show the paths of coins through the vending machine.
Figure 16:
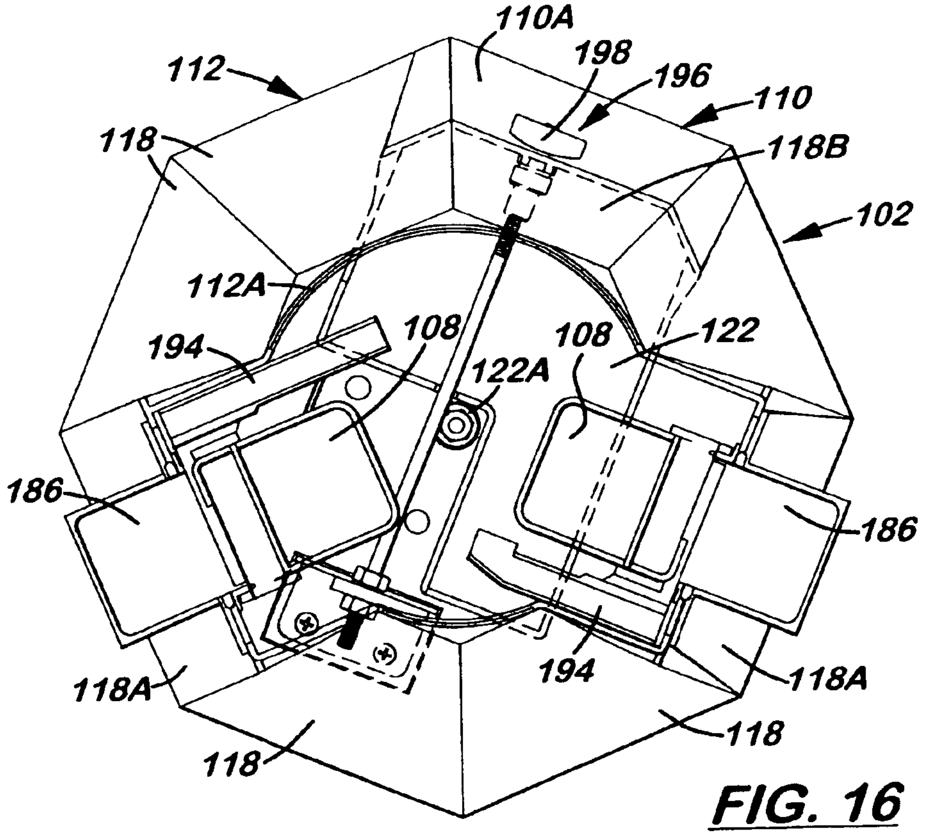
FIG. 16 is a top plan view of the housing of the vending machine similar to that of FIG. 15 also with the remainder of the dispensing mechanisms removed.
Figure 17:
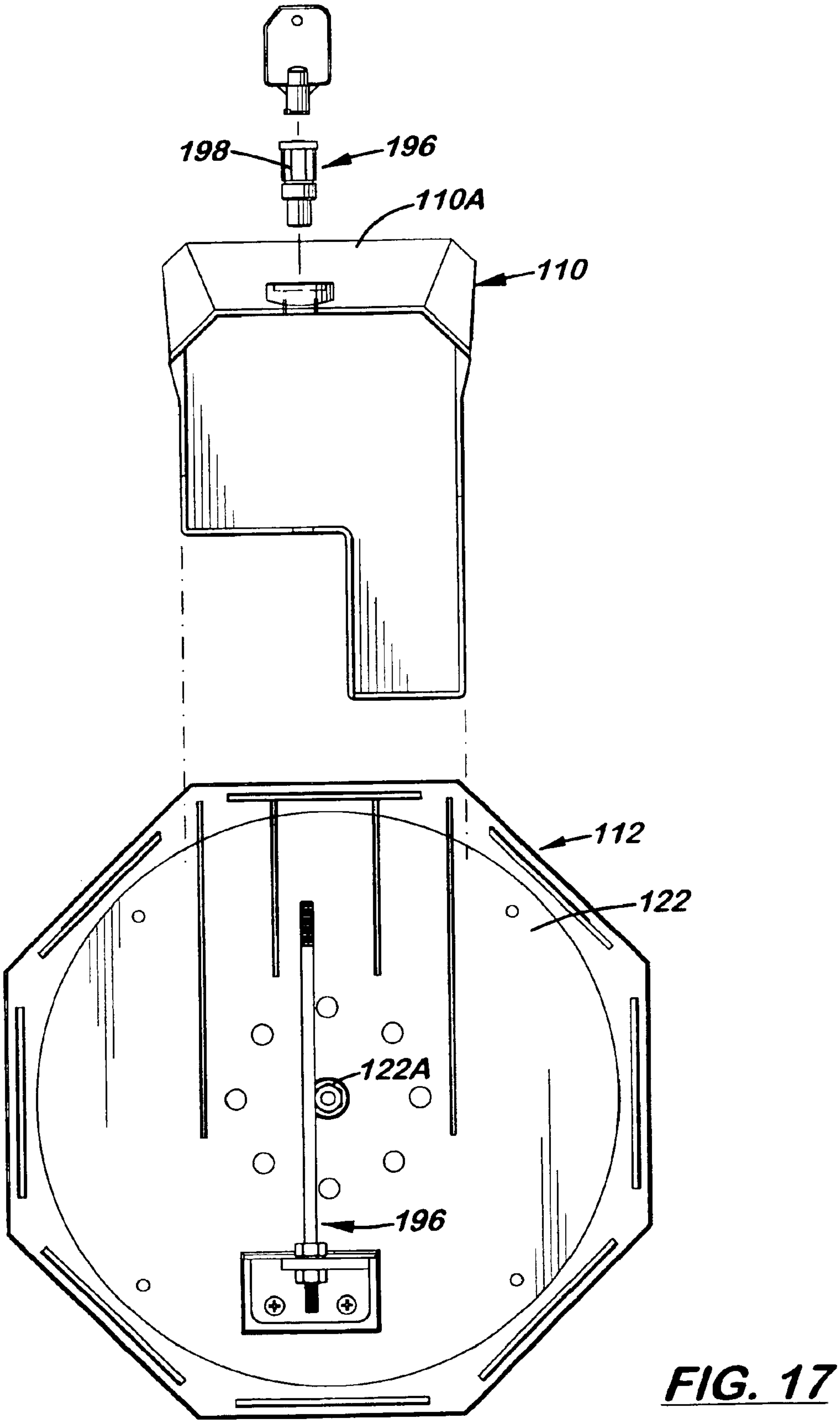
FIG. 17 is an exploded plan view of the housing of the vending machine with portions above the bottom wall of the housing omitted to expose the common coin collection box and an lock device located in the interior chamber of the housing immediately above the bottom wall thereof.
Figure 18:
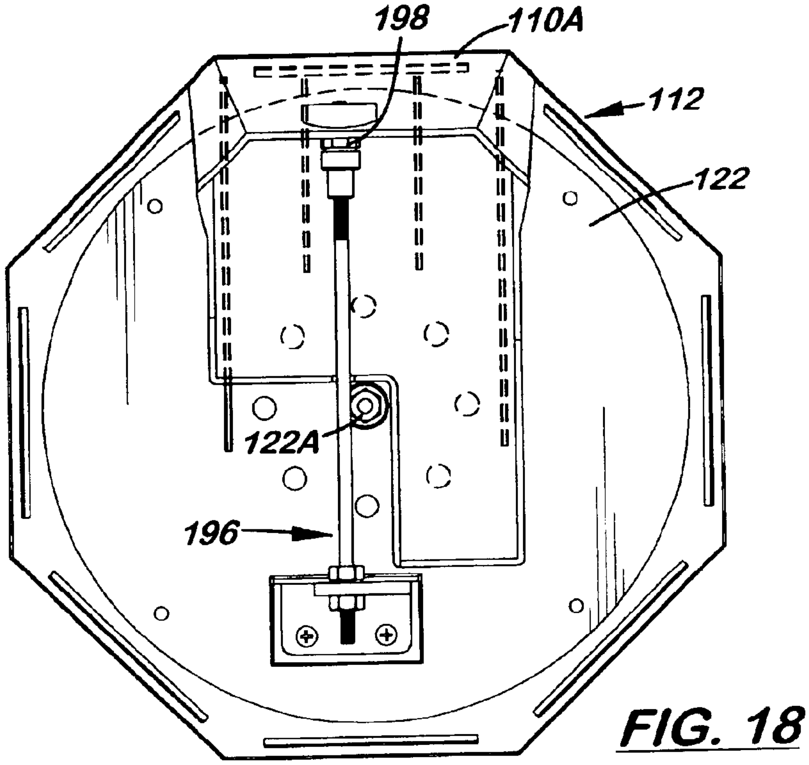
FIG. 18 is an assembled plan view of the housing, common coin collection box and lock device of the vending machine of FIG. 17.
Figure 19:
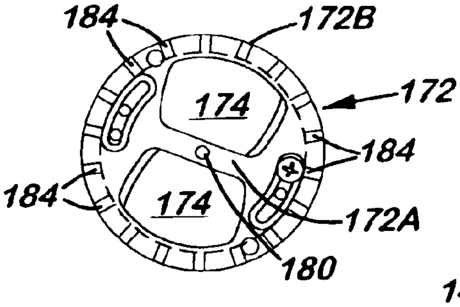
FIG. 19 is a bottom plan view of one of the dispensing wheels removed from the vending machine of FIG. 10.
Figure 20:
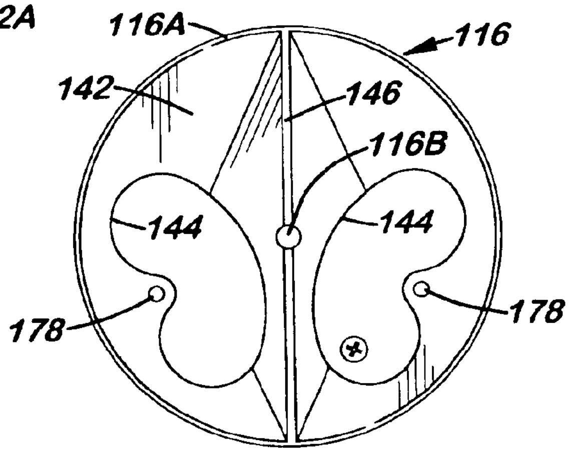
FIG. 20 is a top plan view of the dual hopper removed from the vending machine of FIG. 10.
Figure 21:
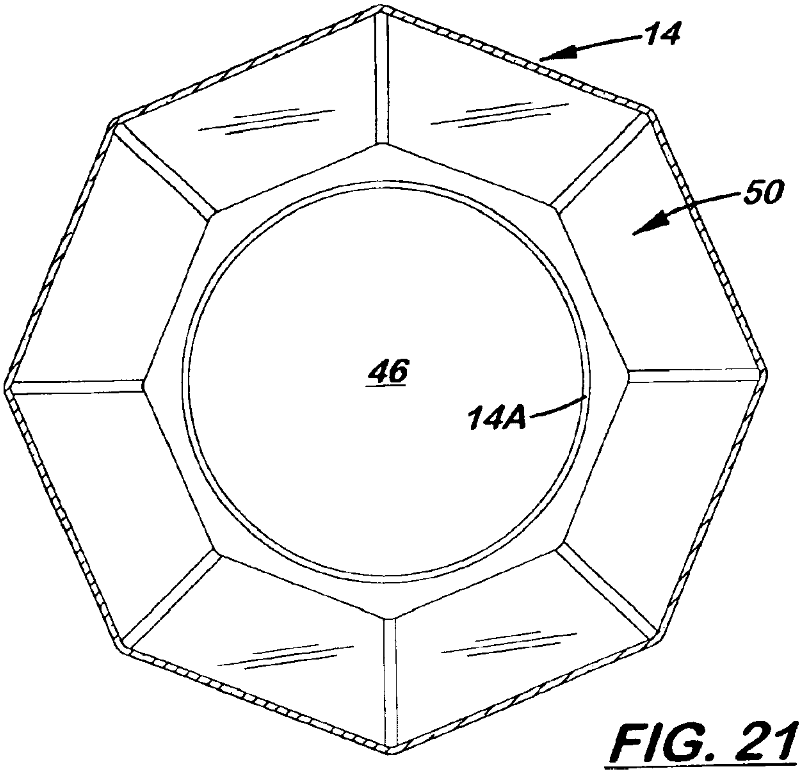
FIG. 21 (PRIOR ART)
FIG. 21 is a cross-sectional view of the globe of the prior art Vendmax vending machine.
Figure 22:
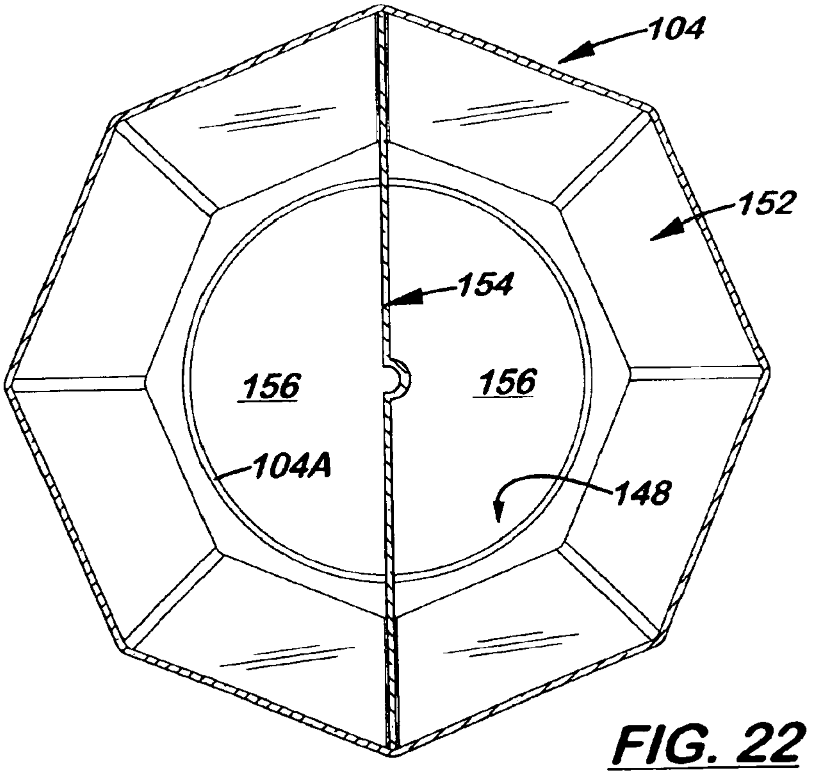
FIG. 22 is a cross-sectional view of the globe of the dual station vending machine of the present invention.

Referring to FIGS. 10, 11 and 22, the globe 104 preferably is made of a transparent material, such as a suitable plastic, and has generally the same polygonal configuration as the housing 112 and opposite annular lower and upper rims 104A, 104B defining lower and upper openings 148, 150 in the globe 104. The globe 104 at its lower rim 104A, by resting upon the top flange 126 of the receptacle 114, is supported by the top rim 112A of the housing 112. The globe 104 has an interior reservoir 152 and a central vertical partition 154 extending diametrically across the globe 104 and dividing its interior reservoir 152 into a pair of interior compartments 156 disposed side-by-side, but isolated from, one another. Furthermore, the vertical partition 154 is disposed above and aligned with the raised ridge 146 of the dual hopper 116 such that each compartment 156 of the glove 104 is provided in communication with one of the openings 144 of the dual hopper 116 such that each opening 144 underlies and is aligned with one compartment 156 of the globe 104 and overlies and is aligned with one dispensing mechanism 106 whereby each opening 144 and the discharge chute 108 therebelow can receive product items from only the one of the globe compartments 156 generally aligned above it. Thus, one compartment 156 can hold one type of product item for feeding by gravity through only a corresponding one of the openings 144 of the dual hopper 116 and a corresponding one of the discharge openings 136 in the receptacle 114 upon actuation of the dual station vending machine 100 by a corresponding one of the coin-operated dispensing mechanisms 106.

Referring again to FIGS. 10–14, the dual station vending machine 100 also includes a top cover 158, an annular cover seat 160, and a pair of tie rods 162. The cover seat 158, being circular in configuration, seats on the upper rim 104B of the globe 104. The top cover 158 rests over the cover seat 158 and thus on the upper rim 104B of the globe 104. The tie rods 162, being elongated bolts, extend downward through ears 160A on the cover seat 160 and through the compartments 156 of the interior reservoir 152 of the globe 104 to where the lower ends of the tie rods 162 are threaded into holes 130A tapped in the ears 130B protruding inwardly from the inner ledge 130 of the receptacle 114 so as to secure the cover seat 160 over the upper opening 150 of the globe 104 and to the receptacle 114.

Referring to FIGS. 10 and 12–15, the coin-operated dispensing mechanisms 106 and the discharge chutes 108 are disposed within the interior chamber 120 of the housing 112. Each dispensing mechanism 106 is mounted to and extends inwardly across the interior chamber 120 from the interior of a respective one of a pair of the side walls 118A being angularly displaced from one another about the central vertical axis X of the housing 112. Each side walls 118A has an angled configuration different than the flat outwardly sloping configurations of the remaining side walls 118. The outer side ledges 128 of the receptacle 114 overlie and cover the upper ends of the side walls 118A of the housing 112.

More particularly, each dispensing mechanism 106 includes a plate 164 attached to the one side wall 118A of the housing 112 having a coin receiving slot 164A in the top of the plate 164, a shaft 166 rotatably mounted to the plate 164, a coin-actuating turning knob 168 mounted to an outer end 166A of the shaft 166 at the exterior of the plate 164 and of the one side wall 118A, and a drive gear 170 attached to an inner end 166B of the shaft 166 for rotation therewith. The drive gear 170 has a series of teeth 170A which radially project outwardly and are attached thereabout.

Referring to FIGS. 10, 12–14 and 19, each dispensing mechanism 106 also includes a dispensing wheel 172 which is a circular disc that seats in the shallow cavity 140 of one of the seat rails 138 formed upon the bottom panel 134 of the receptacle 114 such that each dispensing wheel 172 underlies and is align with only one of the respective compartments 156 of the globe 104 and thus can receive items from only the one globe compartment 156. Each dispensing wheel 172 has a pair of generally rectangular-shaped holes 174 defined therethrough and separated by a diametrical portion 172A thereof. A pair of axles 176 extend through respective apertures 178 formed through the dual hopper 114 and central apertures 180 formed through the diametrical portions 172 of the dispensing wheels 172 and have externally-threaded lower ends 176A which are threaded into internally-threaded lugs 182 attached on the interior of the bottom panel 134 of the receptacle 114. Each of the dispensing wheels 172 also has a peripheral flange 172B which protrude outwardly through the portion of the discharge openings 136 formed in the side wall 132 of the receptacle 114 and is provided with a series of circumferentially arranged teeth 184 attached to and extend downwardly from an underside of the flange 172B such that the series of teeth 184 of the dispensing wheel 172 overlie, intersect with, rest upon, and successively intermesh with, the series of teeth 170A on the drive gear 170 so that the dispensing wheel 172 is rotatably driven relative to the receptacle 114 upon turning of the knob 168 and rotation of the shaft 166 and drive gear 170 therewith.

As the dispensing wheels 172 are rotated about the axles 176 the holes 174 therein are brought successively into alignment over and in communication with the discharge openings 136 in the bottom panel 134 of the receptacle 114 and thus the discharge chutes 108 located below the discharge openings 136. During a single cycle of rotation of each dispensing wheel 172 in response to depositing a coin C in a respective slot 164A and turning the knob 168, one of the holes 174 of each dispensing wheel 172 alternately overlies the respective dispensing opening 136 in the bottom panel 134 of the common receptacle 114. Thus, with each turn of the knob 168 in response to depositing of a coin C in the slot 164A, an item or items of product will drop through a respective one of the holes 174 in the dispensing wheel 172, down the discharge chute 108 to behind an access door 186 which is pivotally attached to each of the side walls 118A of the housing 112 below the knob 168. The user can pivotally open the access door 186 to retrieve the dispensed item(s). Each of the discharge chutes 108 is attached to the housing 112 at an interior location thereon surrounding one of the access doors 186 and extends upwardly therefrom to below a corresponding one of the dispensing wheels 172.

The dual station vending machine 100 also includes a central lock device 188 for securing the top cover 158 on the globe 104 and also the receptacle 114 and globe 104 to the housing 112 is provided in the machine 100. The central lock device 188 includes a key actuated component 190 mounted centrally in the top cover 158 and an elongated rigid rod 192 which extends downward through the globe 104 and the housing 112 and through a central aperture 116B in the dual hopper 116 and a central aperture 134A in the bottom panel 134 of the receptacle 114. The component 190 permits removal of the top cover 158 by authorized personnel in order to refill the globe 104. The elongated rod 192 has an externally-threaded lower end 192A which threads into an internally-threaded lug 122A formed on the interior of the bottom wall 122 of the housing 112.

The common coin collection box 110 is disposed in the interior chamber 120 of the housing 112 immediately above the bottom wall 122 thereof. Also, a pair of elongated coin chutes 194 are disposed in the interior chamber 120 of the housing 112 which extend from the plate 164 of the respective one of the dispensing mechanisms 106 to the common collection box 110 for routing thereto any coins C that were deposited in the coin slot 164A in the plate 164. The common collection box 110 has an exterior end 110A exposed at the exterior of the housing 112 through an opening 112B formed in a third side wall 118B of the multiple side walls 118 spaced angularly from the side walls 118A of the housing 112. A lock device 196 is mounted in the interior chamber 120 of the housing 112 adjacent to the common collection box 110 and has a key actuated component 198 mounted in the exterior end 110A of the common collection box 110 which facilitates removal of the box 110 from the housing 112 by authorized personnel to retrieve the coins C therefrom.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A dual station coin-operated vending machine, comprising:

(a) a common housing defining an interior chamber;

(b) a globe supported on said common housing and having a pair of compartments isolated from one another for containing separate types of product items, said compartments separately communicating with said interior chamber of said common housing;

(c) a pair of coin-operated dispensing mechanisms each disposed in said interior chamber of and supported by said common housing below a respective one of said compartments of said globe, each of said dispensing mechanism being operable in response to depositing of a coin therein by a user to dispense product items from only a respective one of said compartments of said globe;

(d) means for receiving product items dispensed by said dispensing mechanisms so as to provide access to the dispensed product items at an exterior location on said common housing;

(e) a dual hopper supported in said common housing below said globe and above said dispensing mechanisms, said dual hopper including (i) a downwardly concave shaped top surface leading to spaced apart openings in said dual hopper which openings each underlie and align with a respective one of said compartments of said globe and overlie and align with a respective one of said dispensing mechanisms, and (ii) a raised ridge formed on and extending diametrically across said top surface of said dual hopper between said openings so as to isolate said openings from one another such that each of said dispensing mechanisms receive items only from said respective one of said compartments of said globe.

2. The vending machine as defined in claim 1 wherein said housing has a central vertical axis and a polygonal configuration formed by multiple angularly-displaced side walls greater than four in number and defining an interior chamber, two side walls of said multiple side walls being spaced apart by at least one side wall of the multiple side walls and projecting farther radially outwardly from said central vertical axis than said remaining multiple side walls.

3. The vending machine as defined in claim 2 wherein each of said dispensing mechanisms is mounted to one of said two side walls of said housing.

4. The vending machine as defined in claim 1 wherein each of said dispensing mechanisms includes a rotatable dispensing wheel disposed below one of said openings of said dual hopper and above said means for receiving product items.

5. The vending machine as defined in claim 1 wherein said means for receiving dispensed product items includes:

a pair of discharge chutes disposed in said interior chamber of and supported by said common housing below said dispensing mechanisms, each of said discharge chutes being associated with one of said dispensing mechanisms for receiving a product item dispensed by said one dispensing mechanism from said respective one of said compartments of said globe.

6. The vending machine as defined in claim 1 further comprising:

a common coin collection box disposed in said interior chamber of said housing for receiving coins from each of said dispensing mechanisms.

7. The vending machine as defined in claim 1 wherein said globe defines an interior reservoir and has a central vertical partition which extends diametrically across said globe so as to divide said interior reservoir into said pair of compartments.

8. The vending machine as defined in claim 7 wherein said raised ridge of said dual hopper is disposed below and aligned with said central partition of said globe.

9. A dual station coin-operated vending machine, comprising:

(a) a common housing defining an interior chamber and having an annular upper rim;

(b) a globe supported on said common housing and having a pair of compartments isolated from one another for containing separate types of product items, said compartments separately communicating with said interior chamber of said common housing;

(c) a pair of coin-operated dispensing mechanisms each disposed in said interior chamber of and supported by said common housing below a respective one of said compartments of said globe, each of said dispensing mechanism being operable in response to a user depositing of a coin therein to dispense product items from only a respective one of said compartments of said globe;

(d) means for receiving product items dispensed by said dispensing mechanisms so as to provide access to the dispensed product items at an exterior location on said common housing;

(e) a common receptacle disposed in, and supported by said upper rim on, said common housing and having a bottom panel with a pair of dispensing openings defined therein disposed below said compartments of said globe and above said means for receiving product items, each of said dispensing mechanisms extending into and supported by said common receptacle and disposed above a corresponding one of said dispensing openings of said common receptacle; and (f) a dual hopper supported in said common housing by said common receptacle below said globe and above said dispensing mechanisms, said dual hopper including (i) a downwardly concave shaped top surface leading to spaced apart openings in said dual hopper which openings each underlie and align with a respective one of said compartments of said globe and overlie and align with a respective one of said dispensing mechanisms, and (ii) a raised ridge formed on and extending diametrically across said top surface of said dual hopper between said openings so as to isolate said openings from one another such that each of said dispensing mechanisms receive items only from said respective one of said compartments of said globe.

10. The vending machine as defined in claim 9 wherein said housing has a central vertical axis and a polygonal configuration formed by multiple angularly-displaced side walls greater than four in number and defining an interior chamber, two side walls of said multiple side walls being spaced apart by at least one side wall of the multiple side walls and projecting farther radially outwardly from said central vertical axis than said remaining multiple side walls.

11. The vending machine as defined in claim 10 wherein each of said dispensing mechanisms is mounted to one of said two side walls of said housing.

12. The vending machine as defined in claim 9 wherein each of said dispensing mechanisms includes a rotatable dispensing wheel rotatably mounted on said bottom panel of said common receptacle and disposed below one of said openings of said dual hopper and above said means for receiving product items.

13. The vending machine as defined in claim 9 wherein said means for receiving dispensed product items includes:

a pair of discharge chutes disposed in said interior chamber of and supported by said common housing below said dispensing mechanisms, each of said discharge chutes being associated with one of said dispensing mechanisms for receiving a product item dispensed by said one dispensing mechanism from said respective one of said compartments of said globe.

14. The vending machine as defined in claim 9 further comprising:

a common coin collection box disposed in said interior chamber of said housing for receiving coins from each of said dispensing mechanisms.

15. The vending machine as defined in claim 9 wherein said globe defines an interior reservoir and has a central vertical partition which extends diametrically across said globe so as to divide said interior reservoir into said pair of compartments.

16. The vending machine as defined in claim 15 wherein said raised ridge of said dual hopper is disposed below and aligned with said central partition of said globe.

17. A dual station coin-operated vending machine, comprising:

(a) a common housing defining an interior chamber and having an annular upper rim;

(b) a globe supported on said common housing and defining an interior reservoir, said globe having a central vertical partition extending diametrically across said globe so as to divide said reservoir into a pair of compartments, each of said compartments being isolated from the other by said partition for containing separate types of product items, said compartments separately communicating with said interior chamber of said common housing;

(c) a pair of coin-operated dispensing mechanisms each disposed in said interior chamber of and supported by said common housing below a respective one of said compartments of said globe, each of said dispensing mechanism being operable in response to depositing of a coin therein by a user to dispense product items from only a respective one of said compartments of said globe, each of said dispensing mechanisms including a rotatable dispensing wheel;

(d) a pair of discharge chutes each disposed in and supported by the common housing below one of said dispensing mechanisms;

(e) a common receptacle disposed in, and supported by said upper rim on, said common housing and having a bottom panel with a pair of dispensing openings defined therein, each of said dispensing mechanisms extending into said common receptacle with said dispensing wheel of said each dispensing mechanism being supported by said common receptacle above a corresponding one of said dispensing openings of said common receptacle and a corresponding one of the discharge chutes; and (f) a dual hopper supported in said common housing by said common receptacle below said globe and above said dispensing mechanisms, said dual hopper including (i) a downwardly concave shaped top surface leading to spaced apart openings in said dual hopper which openings each underlie and align with a respective one of said compartments of said globe and overlie and align with a respective one of said dispensing mechanisms, and (ii) a raised ridge formed on and extending diametrically across said top surface of said dual hopper between said openings therein and aligned below said central partition of said globe so as to isolate said openings of said dual hopper from one another and thus said dispensing wheels from one another such that each of said dispensing wheels receive items only from said respective one of said compartments of said globe.

18. The vending machine as defined in claim 17 wherein said housing has a central vertical axis and a polygonal configuration formed by multiple angularly-displaced side walls greater than four in number and defining an interior chamber, two side walls of said multiple side walls being spaced apart by at least one side wall of the multiple side walls and projecting farther radially outwardly from said central vertical axis than said remaining multiple side walls.

19. The vending machine as defined in claim 18 wherein each of said dispensing mechanisms is mounted to one of said two side walls of said housing.

20. The vending machine as defined in claim 17 further comprising:

a common coin collection box disposed in said interior chamber of said housing for receiving coins from each of said dispensing mechanisms.

* * * * *